United States Patent
Zhu et al.

(10) Patent No.: US 9,835,099 B2
(45) Date of Patent: Dec. 5, 2017

(54) ENGINE FEEDBACK CONTROL SYSTEM AND METHOD

(71) Applicant: Cummins Inc., Columbus, IN (US)

(72) Inventors: Yongjie Zhu, Troy, MI (US); Vivek A. Sujan, Columbus, IN (US); Govindarajan Kothandaraman, Columbus, IN (US); Timothy R. Frazier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 101 days.

(21) Appl. No.: 14/950,240

(22) Filed: Nov. 24, 2015

(65) Prior Publication Data

US 2016/0084180 A1 Mar. 24, 2016

Related U.S. Application Data

(63) Continuation of application No. 13/656,308, filed on Oct. 19, 2012, now Pat. No. 9,228,511.

(51) Int. Cl.
  *F02D 41/00* (2006.01)
  *F02D 41/14* (2006.01)
  *F02D 41/18* (2006.01)

(52) U.S. Cl.
  CPC ..... *F02D 41/0052* (2013.01); *F02D 41/0072* (2013.01); *F02D 41/1401* (2013.01);
  (Continued)

(58) Field of Classification Search
  CPC ............. F02D 41/0052; F02D 41/0072; F02D 41/1402; F02D 41/1461; F02D 41/1458;
  (Continued)

(56) References Cited

U.S. PATENT DOCUMENTS 5,682,864 A 11/1997 Shirakawa
5,758,309 A 5/1998 Satoh
(Continued)

FOREIGN PATENT DOCUMENTS

CN 1800597 7/2006
CN 201496168 U 6/2010
(Continued)

OTHER PUBLICATIONS

First Office Action and English Translation for German Patent Application No. 11 2011 102 672.2, Issued Mar. 7, 2016, 13 pages.
(Continued)

*Primary Examiner* — Joseph Dallo
(74) *Attorney, Agent, or Firm* — Foley & Lardner LLP

(57) ABSTRACT

This disclosure provides a system and method for controlling internal combustion engine system to reduce operation variations among plural engines. The system and method utilizes single-input-single-output (SISO) control in which a single operating parameter lever is selected from among exhaust gas recirculation (EGR) fraction and charge air mass flow (MCF), and a stored reference value associated with the selected lever is adjusted for an operating point in accordance with a difference between a measured emissions characteristic and a pre-calibrated reference value of the emissions characteristic for that operating point. Adjusting the selected operating parameter lever towards the theoretical pre-calibrated reference value of the operating parameter lever for each of plural operating points can reduce engine-to-engine variations in engine out emissions.

20 Claims, 10 Drawing Sheets

(52) U.S. Cl.
CPC ..... *F02D 41/1402* (2013.01); *F02D 41/1458* (2013.01); *F02D 41/1461* (2013.01); *F02D 41/1462* (2013.01); *F02D 41/1467* (2013.01); *F02D 41/18* (2013.01); *F02D 41/1406* (2013.01); *Y02T 10/47* (2013.01)

(58) Field of Classification Search
CPC ............. F02D 41/1401; F02D 41/1462; F02D 41/1467; F02D 41/18; F02D 41/1406; Y02T 10/47
See application file for complete search history.

(56) References Cited

U.S. PATENT DOCUMENTS

| | | | |
|---|---|---|---|
| 6,209,530 | B1 | 4/2001 | Faletti et al. |
| 6,234,139 | B1 | 5/2001 | Taga et al. |
| 6,510,353 | B1 | 1/2003 | Gudaz et al. |
| 6,553,754 | B2* | 4/2003 | Meyer ................ B01D 53/9431 60/274 |
| 6,910,333 | B2 | 6/2005 | Minemi et al. |
| 6,970,750 | B2 | 11/2005 | Wojsznis et al. |
| 7,063,076 | B1 | 6/2006 | Sun |
| 7,155,334 | B1 | 12/2006 | Stewart et al. |
| 7,212,908 | B2 | 5/2007 | Li et al. |
| 7,328,577 | B2 | 2/2008 | Stewart et al. |
| 7,383,118 | B2 | 6/2008 | Imai et al. |
| 7,389,151 | B2 | 6/2008 | Badami et al. |
| 7,437,874 | B2 | 10/2008 | Ramamurthy et al. |
| 7,676,318 | B2 | 3/2010 | Allain |
| 7,681,394 | B2 | 3/2010 | Haugen |
| 7,698,004 | B2 | 4/2010 | Boyden et al. |
| 7,721,543 | B2* | 5/2010 | Massey ..................... F01P 9/02 60/39.511 |
| 7,797,938 | B2* | 9/2010 | Ruiz ....................... F01K 13/02 60/298 |
| 2002/0165063 | A1* | 11/2002 | Ito ......................... B60W 10/06 477/37 |
| 2003/0005696 | A1* | 1/2003 | Wilson ..................... F01K 21/04 60/618 |
| 2004/0060292 | A1 | 4/2004 | Minemi et al. |
| 2004/0084031 | A1 | 5/2004 | Ito et al. |
| 2005/0262842 | A1 | 12/2005 | Claassen et al. |
| 2006/0196182 | A1 | 9/2006 | Kimoto et al. |
| 2007/0073525 | A1 | 3/2007 | Healy et al. |
| 2008/0264036 | A1 | 10/2008 | Bellovary |
| 2009/0076716 | A1* | 3/2009 | Han ......................... F01N 3/106 701/115 |
| 2009/0192693 | A1* | 7/2009 | Bottcher ............. F02D 41/0072 701/102 |
| 2009/0192699 | A1* | 7/2009 | Bottcher ............. F02D 41/0072 701/108 |
| 2010/0179745 | A1 | 7/2010 | Nakayama et al. |
| 2011/0232263 | A1* | 9/2011 | Yasui ..................... F01N 3/0842 60/274 |

FOREIGN PATENT DOCUMENTS

| | | |
|---|---|---|
| JP | 2005-329843 | 12/2005 |
| JP | 2009-191647 | 8/2009 |
| JP | 2010-013992 | 1/2010 |

OTHER PUBLICATIONS

First Office Action and English translation Chinese Patent Application No. 201180039506.8 Issued Aug. 1, 2014, 18 Pages.

* cited by examiner

ENGINE FEEDBACK CONTROL SYSTEM AND METHOD

This application is a continuation of U.S. patent application Ser. No. 13/656,308, filed Oct. 19, 2012, entitled "ENGINE FEEDBACK CONTROL SYSTEM AND METHOD," which is incorporated herein by reference in its entirety.

TECHNICAL FIELD

The technical field relates to engine feedback control for an internal combustion engine, and more particularly, to an engine feedback control system and method for reducing engine operation variations.

BACKGROUND

Design of internal combustion engine systems involves developing control systems for controlling exhaust gas recirculation (EGR) fraction, charge air mass flow (MCF), fueling, injection timing, and so on, to meet performance and emissions targets. Control is often carried out by an engine control module (ECM) (also called the engine control unit (ECU)) or some other controller utilizing an engine map and/or tables in which pre-calibrated reference values are associated with inputs defining a requested operating condition, such as requested engine speed and load. Reference values can include intake or engine out oxygen concentration, engine out "lambda" ($\lambda$), which is the ratio of the air/fuel to the stoichiometric air/fuel value, and engine out nitrogen oxides (known as NOx), all of which can be measured directly or indirectly (e.g., by way of a virtual sensor). The ECM/ECU receives the measured or determined actual values as a feedback signal to a controller, which adjusts actuators of the engine system (e.g., actuators controlling an EGR valve, fuel injectors etc.) based on differences between the pre-calibrated reference values and corresponding determined actual values (e.g., NOx or $\lambda$ sensor feedback signals) to minimize these differences or otherwise cause the measured/determined values to converge towards the pre-calibrated reference values.

SUMMARY

This disclosure provides a system and method for controlling an internal combustion engine that can reduce or minimize variation among plural engines. The control utilizes a single-input-single-output (SISO) scheme that adjusts an operating parameter of an internal combustion engine based on a difference between a reference value of an emissions characteristic and sensed value of that emissions characteristic.

In one aspect, a SISO control system for an internal combustion engine includes selection module configured to select, for an operating point, one operating parameter lever and one emissions characteristic, where the operating parameter lever is related to one of exhaust gas recirculation (EGR) and charge air mass flow (MCF). A reference retrieving module is adapted to retrieve a pre-calibrated reference value of an associated with the selected emissions characteristic, where the pre-calibrated reference value is based on predetermined reference data associated with a respective operating point of the internal combustion engine. The SISO control system includes a difference calculating module adapted to receive a signal corresponding to a measured value of the emissions characteristic and calculate a difference between the pre-calibrated reference value and the measured value, and a controller adapted to provide a control signal based on the calculated difference. An operating parameter adjustment module is adapted to receive the control signal, determine an adjustment factor value based on the control signal and the operating point, retrieve a stored operating parameter reference value related to selected operating parameter lever for the respective operating point, and adjust the value of the stored operating parameter reference value by an amount based on the adjustment factor value.

In another aspect of the disclosure, a method of controlling an internal combustion engine includes the processes of receiving operating parameters for operating the internal combustion engine at an operating point, determining, for the operating point, one operating parameter reference lever and one emissions characteristic, where the operating parameter reference lever is related to one of exhaust gas recirculation (EGR) fraction and charge air mass flow (MCF), retrieving a reference value of the emissions characteristic based on predetermined reference data and the requested operating point, receiving a signal corresponding to a measured value of the emissions characteristic, and determining a control signal based on the difference between the retrieved reference value and the measured value. The method further includes determining, using a processor, an adjustment factor value based on the control signal and the requested operating point, retrieving a stored operating parameter reference value associated with the determined operating parameter reference lever for the current requested operating point, and adjusting, using the processor, the value of the operating parameter based on the determined adjustment factor value.

DETAILED DESCRIPTION

Figure 1:
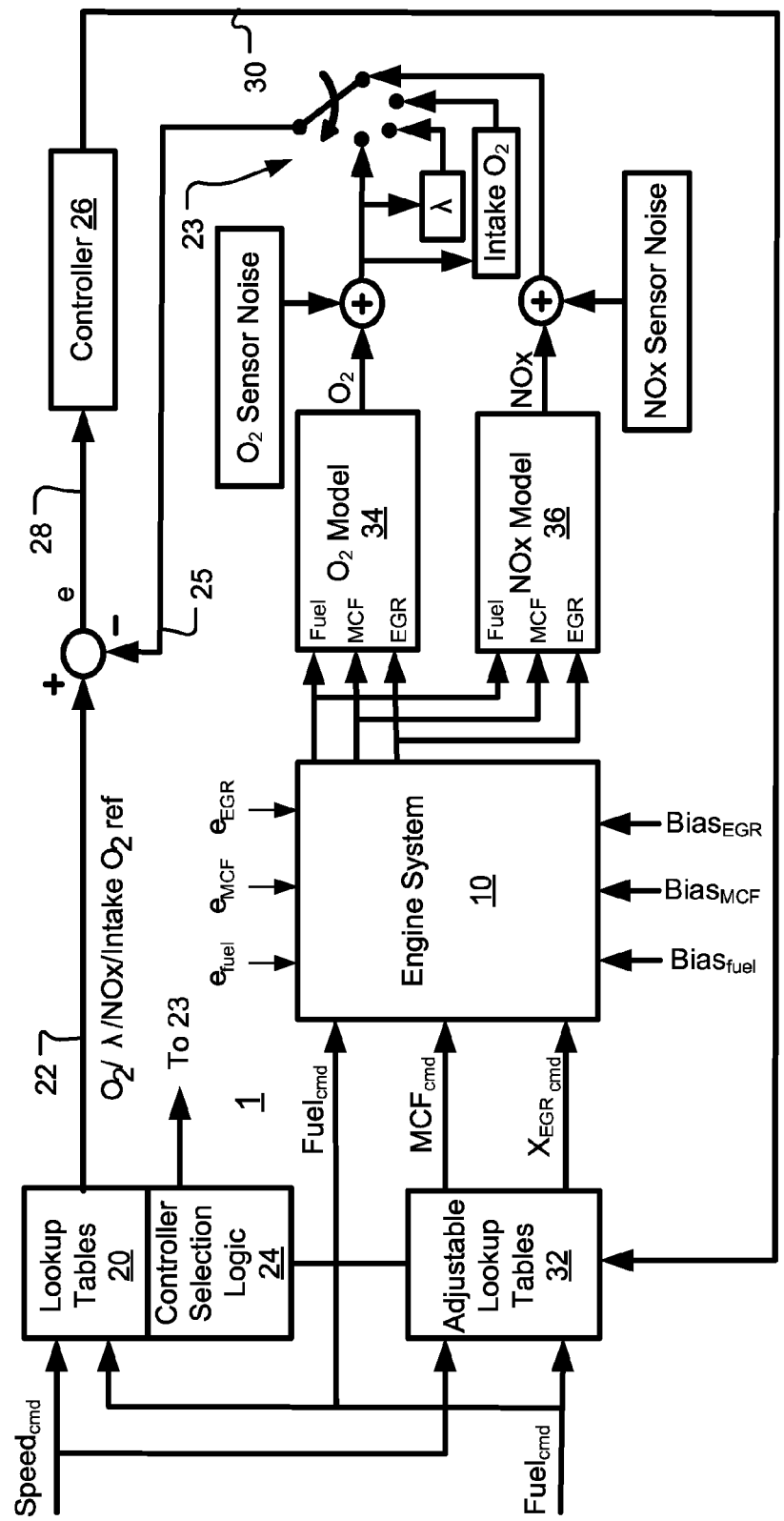
FIG. 1 is a diagram of an internal combustion engine control system according to an exemplary embodiment.
Figure 2A:
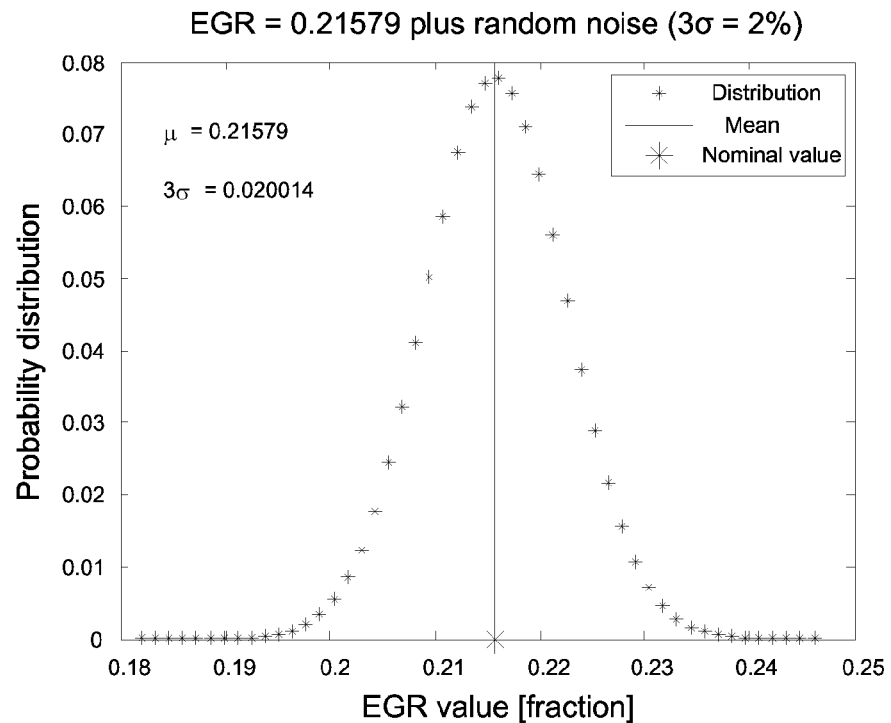
FIGS. 2A to 2F are probability distribution graphs for EGR, MCF, Fuel, exhaust $O_2$, $\lambda$, and NOx including noise only at an exemplary operating mode.
Figure 2B:
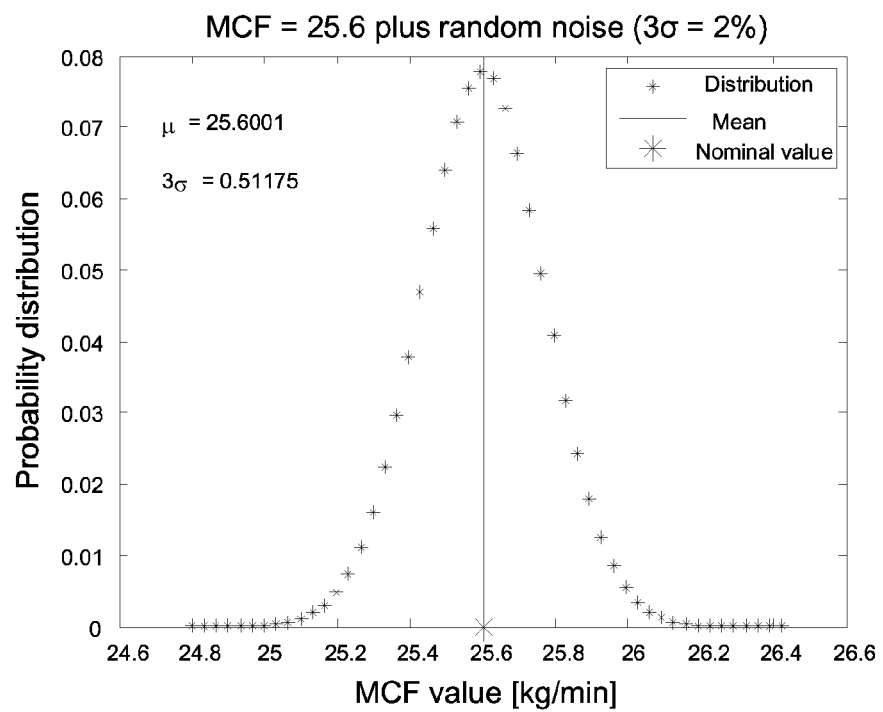
Figure 2C:
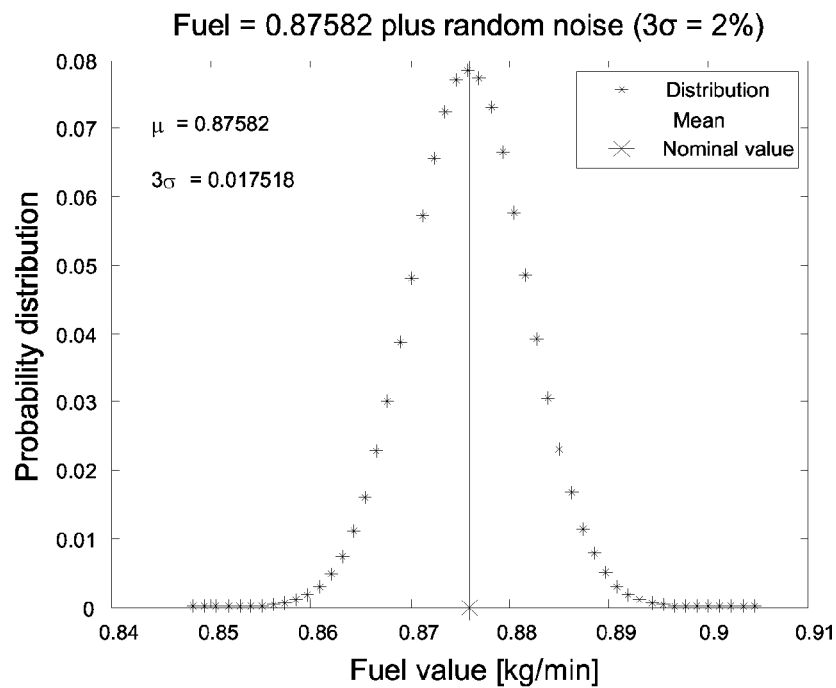
Figure 2D:
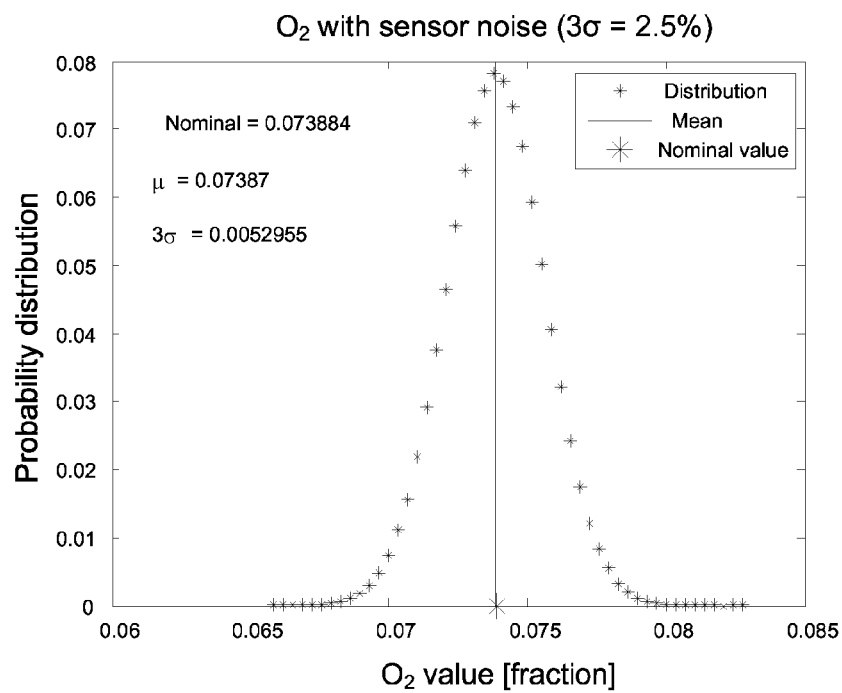
Figure 2E:
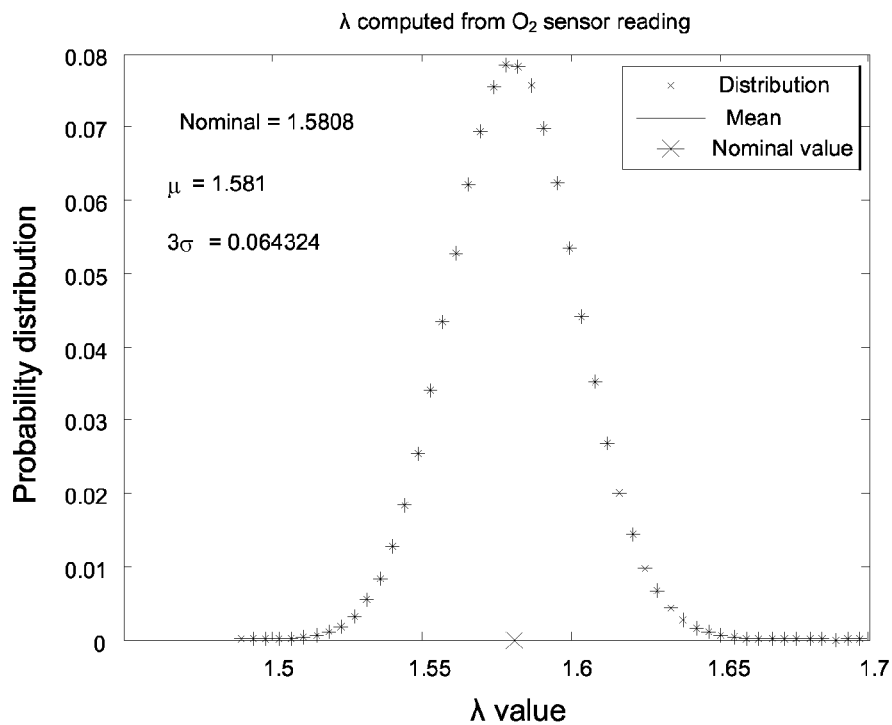
Figure 2F:
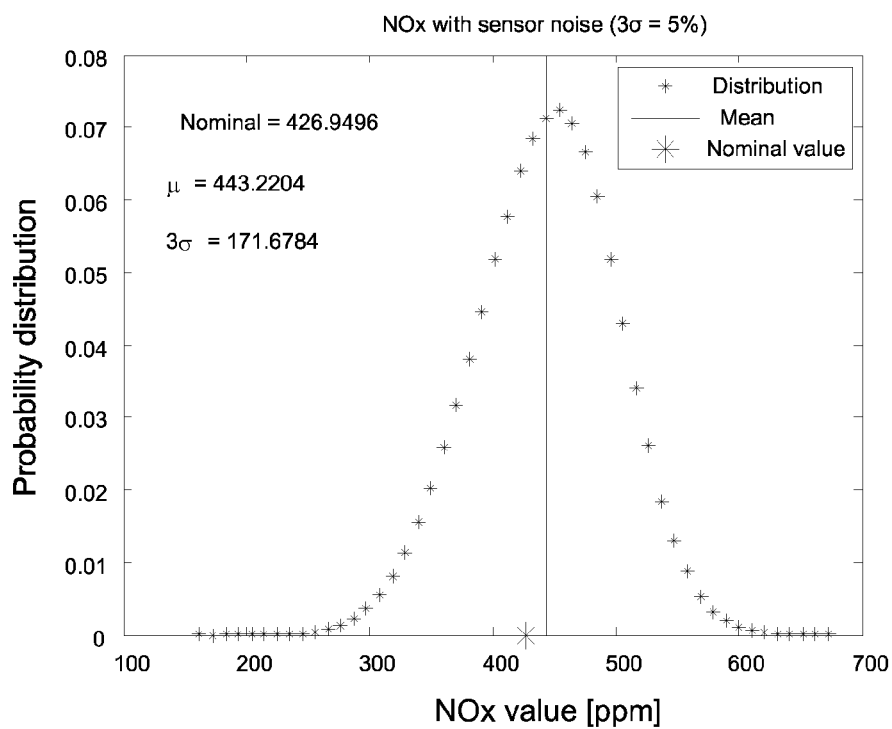

The inventors realized that variation between engine systems can result from bias (i.e., noise from one engine to another engine), random noise (i.e., noise within one engine) and sensor noise, and can cause variations in engine out emissions such as particulate matter (PM). For example, bias can arise from engine-to-engine differences in EGR systems ($Bias_{EGR}$), mass charge flow systems ($Bias_{MCF}$), and/or fuel systems ($Bias_{fuel}$), random noise within an engine in the EGR systems ($e_{EGR}$), mass charge flow systems ($e_{MCF}$), and/or fuel systems ($e_{fuel}$), and noise in the sensors readings, such as noise in the $O_2$, $\lambda$, and NOx sensor outputs. This noise can cause variations in amounts of emissions output from one engine operating in a particular mode to be different from emissions output from another same type of engine operating in the same mode and using the same pre-calibrated operating parameters. This disclosure describes a system and method including a control strategy that can adjust, in an engine system having noise and bias, one or more pre-calibrated, or baseline reference values utilized by a controller of the engine system that controls the engine system operation. The system and method updates, rewrites or builds a new engine map (e.g., lookup tables) over plural modes to minimize diversions in the engine out emission levels and/or ensure compliance with emissions requirements.

Many aspects of this disclosure are described in terms of sequences of actions to be performed by elements of a driver, controller, control module and/or a computer system or other hardware capable of executing programmed instructions. These elements can be embodied in a controller of an engines system, such as an ECM (ECU), or in a controller separate from, and communicating with an ECM/ECU. In an embodiment, the controller and/or ECM/ECU can be part of a controller area network (CAN) in which the controller, sensor, actuators communicate via digital CAN messages. It will be recognized that in each of the embodiments, the various actions for implementing the control strategy could be performed by specialized circuits (e.g., discrete logic gates interconnected to perform a specialized function), by program instructions, such as program modules, being executed by one or more processors (e.g., a central processing unit (CPU) or microprocessor), or by a combination of both, all of which can be implemented in a hardware and/or software of the ECM/ECU and/or other controller or plural controllers. Logic of embodiments consistent with the disclosure can be implemented with any type of appropriate hardware and/or software, with portions residing in the form of computer readable storage medium with a control algorithm recorded thereon such as the executable logic and instructions disclosed herein, and can be programmed, for example, to include one or more singular or multi-dimensional lookup tables and/or calibration parameters. The computer readable medium can comprise a random access memory (RAM), a read-only memory (ROM), an erasable programmable read-only memory (EPROM or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

FIG. 1 is a diagram of an exemplary SISO (single-input-single-output) internal combustion engine control system 1 that can adjust for noise in engine subsystems, such as EGR, MCF, and fuel subsystems, among plural internal combustion engine systems to minimize corresponding variations in engine out emissions over plural operating modes. As shown in FIG. 1, an internal combustion engine system 10 operates based a requested engine speed and fueling rate, for example, as requested by an operator of a vehicle powered by the engine or as set for a stationary engine application. The engine system 10 includes cylinders formed in an engine block (not shown). Each of the cylinders contains a reciprocating piston and is covered with a cylinder head including intake and exhaust valves to define a combustion chamber. An intake valve (or valves) associated with each cylinder is fluidly connected to an intake manifold (not shown) by way of intake port and the exhaust valve (or valves) associated each cylinder is fluidly connected with an exhaust manifold (not shown) by way of an exhaust port. The exhaust manifold has an outlet for supplying EGR gas to a mixer in which intake air and the EGR gas mix before being provided to the intake manifold. The amount of EGR fraction in the air/exhaust gas mixture can be metered by way of an EGR valve mechanism controlled by an actuator. The MCF of intake air supplied to each cylinder also can be metered by one or more mechanisms that are actuator-controlled. For example, an engine system can include a variable geometry turbocharger (VGT), a throttle, and a turbocharger bypass valve (not shown).

The requested operation is depicted in FIG. 1 as engine speed command $Speed_{cmd}$ and fuel rate command $Fuel_{cmd}$. These commands are provided to a set of static lookup tables 20 to determine a pre-calibrated reference value for each of command parameters MCF ($MCF_{cmd}$) and EGR fraction ($X_{EGRcmd}$), and engine out $O_2$, engine out engine out NOx, and intake $O_2$ corresponding to a current operating point or mode defined by the command parameters. In response, one or more of the lookup tables 20 provide a reference signal corresponding to the reference value to signal path 22. The term "pre-calibrated" is used herein to describe a predetermined value derived by experiment and/or calculation and represents a baseline value corresponding to a requested engine speed and fueling requirement. A pre-calibrated value is sometimes referred to herein as a "normal" or "nominal" (noise-free) value that is predetermined, stored in memory, and accessible by the engine system ECM/ECU (or other engine system controller).

As shown in FIG. 1, the engine system 10 can be subject to one or more noise sources, such as the depicted $Bias_{EGR}$, $Bias_{MCF}$, and $Bias_{fuel}$ (bias noise from engine-to-engine), $e_{EGR}$, $e_{MCF}$, and/or $e_{fuel}$ (random noise within an engine) and/or other noise sources. For example, fuel system errors can include, but are not limited to mechanical variation among injector profiles via manufacturing processes, pressure variation related to sensor profiles, creep/wear of the fuel system, and electrical related errors. Studying the baseline engine system under random noise provides a mean and standard deviation, or sigma ($\sigma$) value for each of the outputs O2 (intake and exhaust), $\lambda$, and NOx of the engine system 10. These mean values can be used as reference, or pre-calibrated outputs.

FIGS. 2A to 2F show exemplary baseline probability distribution graphs for EGR, MCF, Fuel, exhaust $O_2$, $\lambda$, and NOx for a B75 mode of a HDCC driving cycle where the $3\sigma$ values of noise is 2% for EGR, MCF, Fuel, 2.5% for $O_2$ sensor noise, and 5% for NOx sensor noise. As can be seen, the median and mean for each curve is close, and hence it can be assumed that distributions are normal. For each of $O_2$ and $\lambda$, the statistical mean (random noise due to sensing) is close to the nominal (noise free) value. Using these findings, a statistical analysis of bias in an engine system can be performed to capture engine-to-engine variation.

Figure 3:
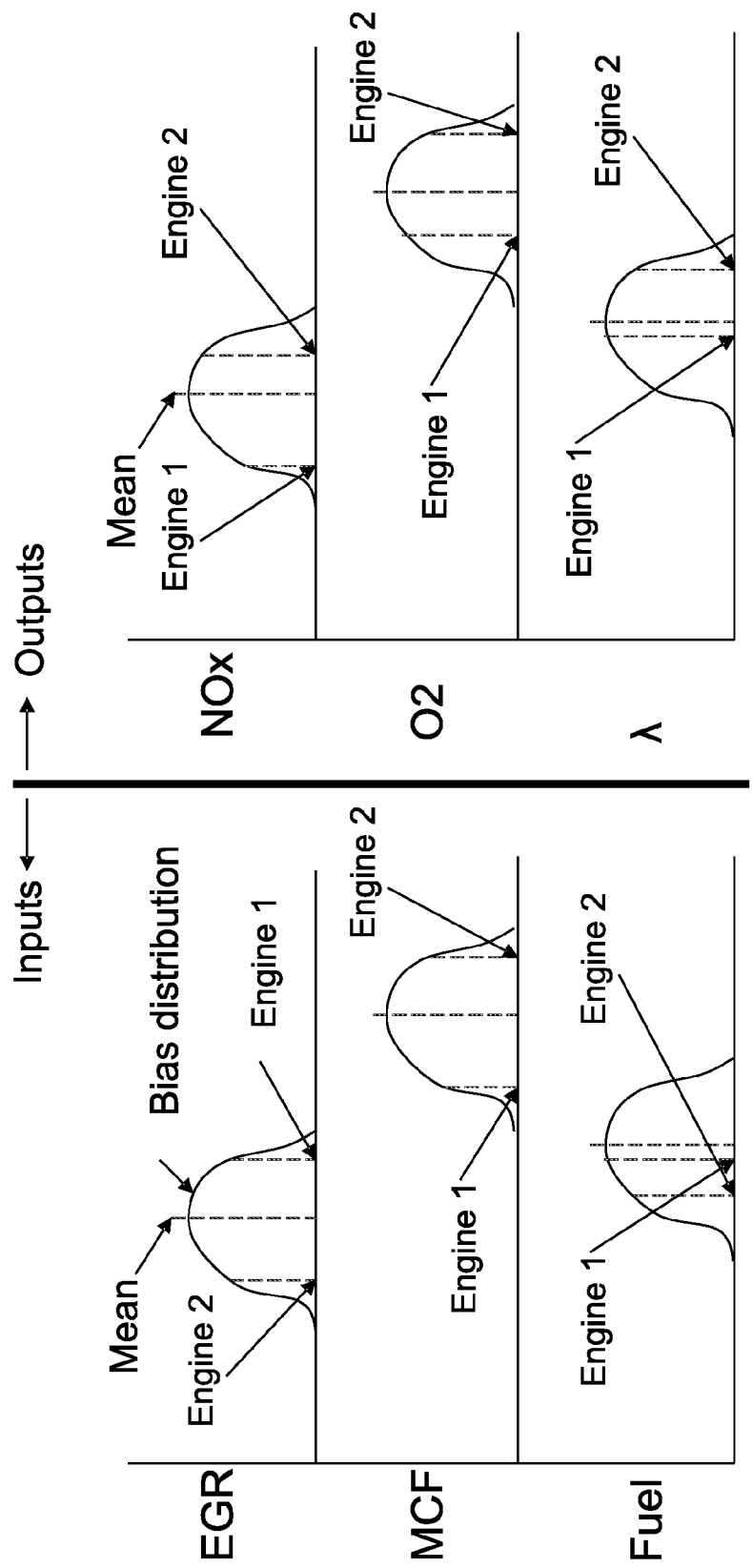
FIG. 3 is a diagram showing exemplary probability distributions of EGR, Fuel, NOx, exhaust $O_2$, and $\lambda$ including bias and noise for a sample of engines.

FIG. 3 is a diagram showing exemplary bias distributions of an engine sample and two engine systems, Engine 1 and Engine 2, lie in each bias distribution. As can be seen from FIG. 3, Engine 1 and Engine 2 respond differently, relative to one another, to a same commanded triplet: MCF, EGR and fueling. The mean of the bias distributions shown in FIG. 3 the baseline, or nominal engine value. For Engine 1 shown in FIG. 3, the EGR fraction is positively biased, the MCF is negatively biased, and the fueling is negatively biased compared with the nominal mean values. For Engine 2, the EGR fraction is negatively biased, the MCF is positively biased, and the fuel is negatively biased compared with the nominal mean values.

To determine statistics with bias and noise, an analysis can be run as follows. Each engine is considered to be an input-output system with the following inputs: FOR, MCF and Fuel and the following outputs: NOx, O2 and $\lambda$. The population of engines is modeled as a statistical distribution with the properties of the nominal engine as mean values (i.e., the EGR, MCF and Fuel of the nominal engine will be the mean input values, and, the corresponding NOx, O2 and $\lambda$ will be the mean output values). The standard deviation of this distribution can be chosen as, for example, as corresponding to EGR Fraction: 2%, MCF: 4%, and Fuel: 2%. From this distribution, the above Engine 1 will have EGR, MCF and Fuel different from the mean, but within the bias distribution. Similarly Engine 1 will have NOx, O2 and $\lambda$ different from the mean, but within the distribution for the outputs. The inputs and the outputs are different from the mean because Engine 1 is not the nominal engine. For Engine 1, we can command the mean EGR, MCF and Fuel as shown in FIG. 3, but due to measurement noises, actuator noises, and/or other noises, these values will not be carried out. So, for that one engine, Engine 1, the noise is added to the inputs and measurement noise and get the output, for example, adding the following noise EGR Fraction: 2%, MCF: 2%, $O_2$ sensor noise: 2.5%, and NOx sensor noise: 5%, 10%, or 15%. This is repeated using a different noise to the inputs and measurement and get the output over many times (e.g., thousands of times) for just Engine 1, to give a distribution for that one engine. We can make similar determinations for Engine 2, and other engines taken from the engine population. Hence, the effects of bias (engine to engine variation) and noise (variation within a single engine) can be determined by choosing different bias value sets for the triplet [EGR, Fuel], and for each bias triplet above representing one engine (i.e., EGR, MCF, and Fuel), values of NOx, $O_2$, and $\lambda$ corresponding to various noise values can be evaluated and determined. The mean value of NOx, $O_2$, and $\lambda$ for this engine can be determined from these corresponding values. The mean and the $\sigma$ of the NOx, $O_2$, and $\lambda$ provide the mean and the a of noisy data with bias.

A strategy of the internal combustion engine control system 1 is to move the biased plus noise mean value of the NOx, $O_2$, and/or $\lambda$ statistic distribution to be controlled towards the noisy mean value utilizing one of two levers: EGR fraction ($X_{EGR}$) and MCF, and the value one of four physical or virtual sensors measuring an emissions characteristic, namely exhaust $O_2$, NOx, $\lambda$ and intake $O_2$. Returning to FIG. 1, the SISO internal combustion engine control system includes controller selection logic 24, which can be associated with and/or included with the lookup tables 20.

For each requested or expected operating point, controller selection logic 24 determines whether to control MCF or EGR fraction as a lever to manipulate one of the emissions characteristics exhaust $O_2$, $\lambda$, NOx, and intake $O_2$ to compensate for bias in the engine system 10. In other words, based on a current or expected operating mode speed/torque demand, controller selection logic 25 determines which one of eight controllers operates to adjust an amount of $O_2$ and/or NOx output from the engine system 10. Selector 23 selects one of exhaust $O_2$, $\lambda$, and NOx intake $O_2$ based on the selected controller selection logic 24 and provides the selected measured value on feedback path 25 e.g., as a CAN message). After selecting a controller i.e., an operating parameter lever and sensor pair), the internal combustion engine control system 1 adjusts the operating parameter lever according to a closed-loop feedback signal to move the emissions characteristic mean towards the mean of the baseline engine.

Figure 4B:
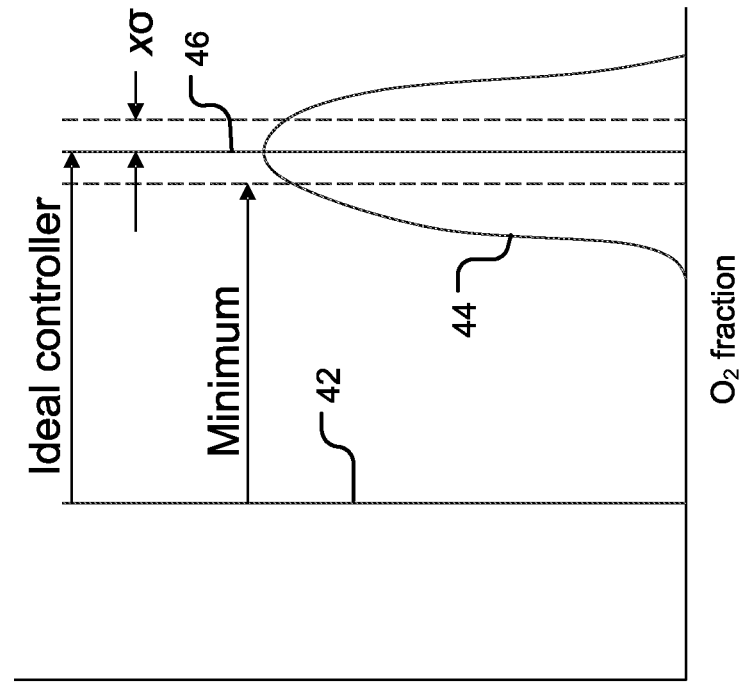
FIG. 4A shows a distribution of $O_2$ including bias and noise for an engine with bias and a distribution of $O_2$ for a baseline engine including noise only, and 4B shows an adjustment of the mean for the distribution of $O_2$ including bias and noise towards the mean of the noise only distribution.
Figure 4A:
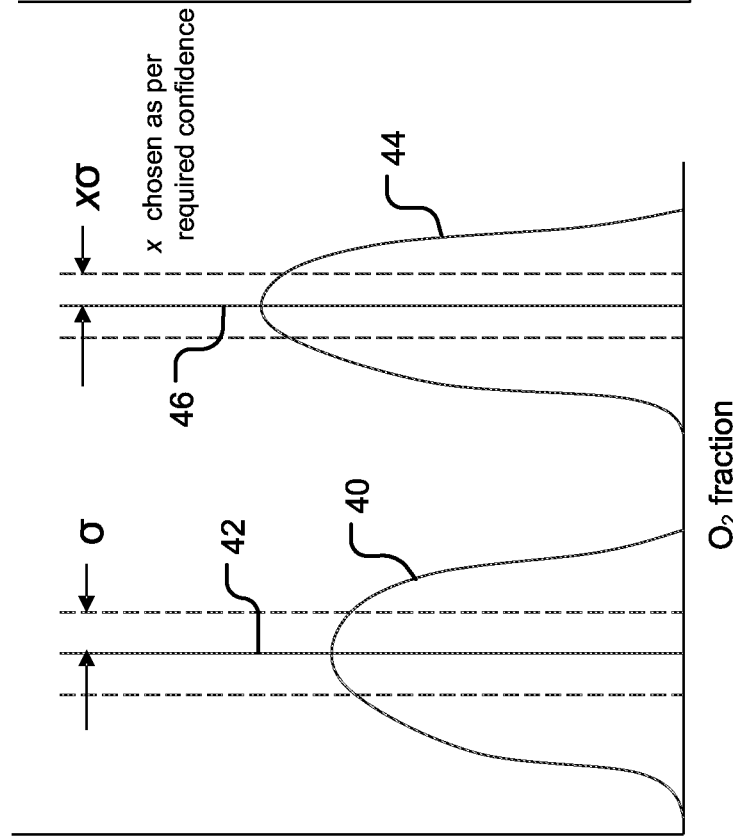

FIG. 4A shows an example of a noise distribution curve 40 related to an uncontrolled emissions characteristic, here $O_2$ fraction, where the distribution includes bias and random noise and is centered about bias mean 42. Also shown in FIG. 4A is the noise distribution curve 44 for an operating point corresponding to the pre-calibrated statistics for $O_2$. Distribution curve 44 includes only random noise for the operating point, where the $O_2$ fraction values are distributed about mean 46. The aim of the controller selected by controller selection logic 24 is to move the biased mean 42 towards the mean 46, as shown in FIG. 4B. For example, if exhaust $O_2$ is controlled by EGR fraction as the lever, the bias mean 42 must tend towards the mean 46 of the noise only distribution 44.

FIGS. 4A and 4B also show a confidence interval centered on the mean 46 and equal to $2(x)(\sigma)$, where x is chosen to define a degree of confidence (i.e., increasing the value of x increases confidence, with x=1 corresponding to about 85% confidence). In an embodiment, the amount of movement of the mean 42 can depend on a set confidence level. For example, if the bias mean 42 lies within the confidence interval, then it is considered that it cannot be distinguished from noise and is not moved (i.e., no control action taken). If the bias mean 42 lies outside the confidence interval, as shown in FIG. 4B, the bias mean can be moved to at least the nearest confidence boundary via control of EGR or MCF, as shown by the arrow labeled "Minimum."

The amount of movement of the bias and noise mean 42 is calculated using a feedback loop. Referring again to FIG. 1, a controller 26, for example, a PID (i.e., proportional-integral-derivative) controller, operates to minimize error signal "e" corresponding to the difference between the feedback signal on path 24 and the reference signal corresponding to the pre-calibrated reference value on signal path 22. The controller 26 generates a control signal based on the value of the error signal e, and provides the control signal to signal path 30 leading to adjustable lookup tables 32. The adjustable lookup tables 32 receive the control signal output by controller 26 and generate MCF command $MCF_{cmd}$ and EGR fraction command $X_{EGRcmd}$ based on the currently requested $Speed_{cmd}$ and $Fuel_{cmd}$ commands and the control signal. The $X_{EGRcmd}$, $MCF_{cmd}$ and $Fuel_{cmd}$ commands are then provided to the respective EGR, MCF, and fueling subsystems of the internal combustion engine system 10.

In an embodiment, the adjustable lookup tables 32 include tables related to steady state operating conditions, known as $\alpha_1$ lookup tables, for steady state reference value lookups, and tables related to transient state operating conditions, known as $\alpha_0$ lookup tables, for transient state reference value lookups related to transient operating conditions. Initially, the $\alpha_1$ and $\alpha_0$ lookup tables can be populated with data related to pre-calibrated (nominal) values, such as target reference values of a baseline engine necessary for compliance with government mandates. However, during operation of the engine system 10, the $\alpha_1$ lookup tables are adjustable as a function of the error signal e provided to the controller 26 to account for variations resulting from noise in the engine system 10 and/or sensors (not shown).

The sensors of engine control system 1 includes an $O_2$ model 34 and an NOx model 36, which respectively calculate the engine out $O_2$ fraction and the engine out NOx amounts. The MCF, EGR fraction and Fuel inputs to the $O_2$ Model 34 and NOx Model 36 can be measured values or estimates. For example, EGR could be measured and MCF and Fuel could be estimates. Engine system 10 can have either real sensors to measure these values or code in the ECM to estimate these values. The exhaust $O_2$, $\lambda$, NOx, and intake $O_2$ can readily be derived from the model outputs and provided to selector 23, which selects one of the derived values according to the monitored parameter of the selected controller and provides a signal corresponding to the selected value on the feedback path 25. These measured values include bias and random noise from the subsystems controlling the EGR, MCF and fuel provided to the Engine System 10 (where the bias and random noise are depicted as separate inputs in FIG. 1). The following examples for the models can comprise code for calculation various elements of the virtual elements of the model can be replaced with physical sensors, for example, the $\phi$ or $O_2(\%)$ calculation below can be replaced by a physical sensor.

The $O_2$ model 34 can utilize an equation based model based on the chemical reaction equation:

$$\varepsilon\varphi CH_y + (O_2 + \psi N_2) \rightarrow \varepsilon\varphi CO_2 + 2(1-\varepsilon)\varphi H_2O + (1-\varphi)O_2 + \psi N_2$$

where:

$$\varepsilon = \frac{4}{4 + y(1.8 \text{ for } \#2 \text{ diesel})},$$

$$\psi = 3.773,$$

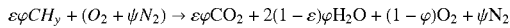

$$\varphi = \frac{1}{\lambda} = \frac{\left(\frac{A}{F}\right)_s}{\left(\frac{A}{F}\right)} = \frac{14.5(\text{for } \#2 \text{ diesel})}{\frac{A}{F}} = \frac{14.5\dot{m}_f}{\dot{m}_a} = \frac{14.5\dot{m}_f}{\dot{m}_{CF}(1 - X_{EGR})},$$

and $O_2(\%) = 100 * \frac{1-\varphi}{(1-\varepsilon)\varphi + 1 + \psi}$ where $\varphi$ is the equivalence ratio.

Alternatively, $O_2$ model 34 can determine the $O_2$ fraction in the exhaust based on the oxidation of diesel fuel under lean operating conditions using an iterative process.

The NOx Model 36 can be, for example, a regression model based on MCF, EGR, rail pressure, final timing, main quantity, and post quantity; a model based on direct lookup table using test cell data; and an MLR (Multiple Linear Regression) model. In an MLR model, MCF, EGR fraction, and total fuel qty. are the independent variables (IVs) and are inputs to a 3D NOx lookup table. Each of the IV's are measured values or an output of a virtual sensor based on some measured value. The MLR data can be smoothed and unknown areas of table can be extrapolated to known areas.

The internal combustion engine control system 1 is particularly useful for controlling amounts of PM and NOx emissions output from an engine system. For example, an embodiment focusing on managing PM output among a population of engines will attempt to mitigate an amount of PM coining out of off-nominal engines in that population to reduce diesel particulate filter (DPF) failures. Because PM is very much dependent on value, if the balance and other critical parameters are controlled with respect to the baseline engine through the levers of $X_{EGR}$ and MCF, then excursions or deviations of PM in off-nominal engines can be avoided and design targets can be moved within or closer to a target emissions limit.

The relationship between NOx and PM is understood, and it is also understood that NOx is heavily controlled by the amount of EGR exhaust gas flowing into the intake manifold of the engine system 10. Reducing an amount of NOx can involve adding more EGR to the intake of the engine system 10, and reducing an amount of PM can involve increasing an amount of $\lambda$ increase the amount of air to make fuel burn more completely. As more air is added, more NOx is produced; and with less air added, more PM is produced. Hence, there is a tradeoff between PM and NOx outputs. However, in different parts of an engine's operating map, NOx can be more dependent on MCF compared with EGR fraction, and also can be a function of how the engine is calibrated. Thus, a selection of which lever to be used (i.e., EGR fraction or MCF) for adjusting a particular emission product can depend, or be based on whether the engine is operating in a steady state mode or a transient state mode. Where a particular engine is operating in those modes, and can be different for different engine types at a same operating point.

Using internal combustion engine control system 1, an engine in the field can determine whether it is going off calibrated targets based on signals of its physical or virtual sensors. For example, using a signal from a NOx sensor in the exhaust stream downstream of a turbocharger (not shown), the controller 26 would be able to determine whether the value indicated by the NOx sensor signal, which indicates the actual engine out NOx level, corresponds to what the NOx emission should be based on a pre-calibrated reference value. If the controller 26 determines that a difference exists between the sensed and pre-calibrated values, it can take that difference into account and start adjusting an operating parameter reference value (i.e., the MCF or EGR fraction) as a lever to help bring the engine out NOx target to where it should be, and if combined correctly with $\lambda$ control, PM can also be controlled within a target value.

Figure 5:
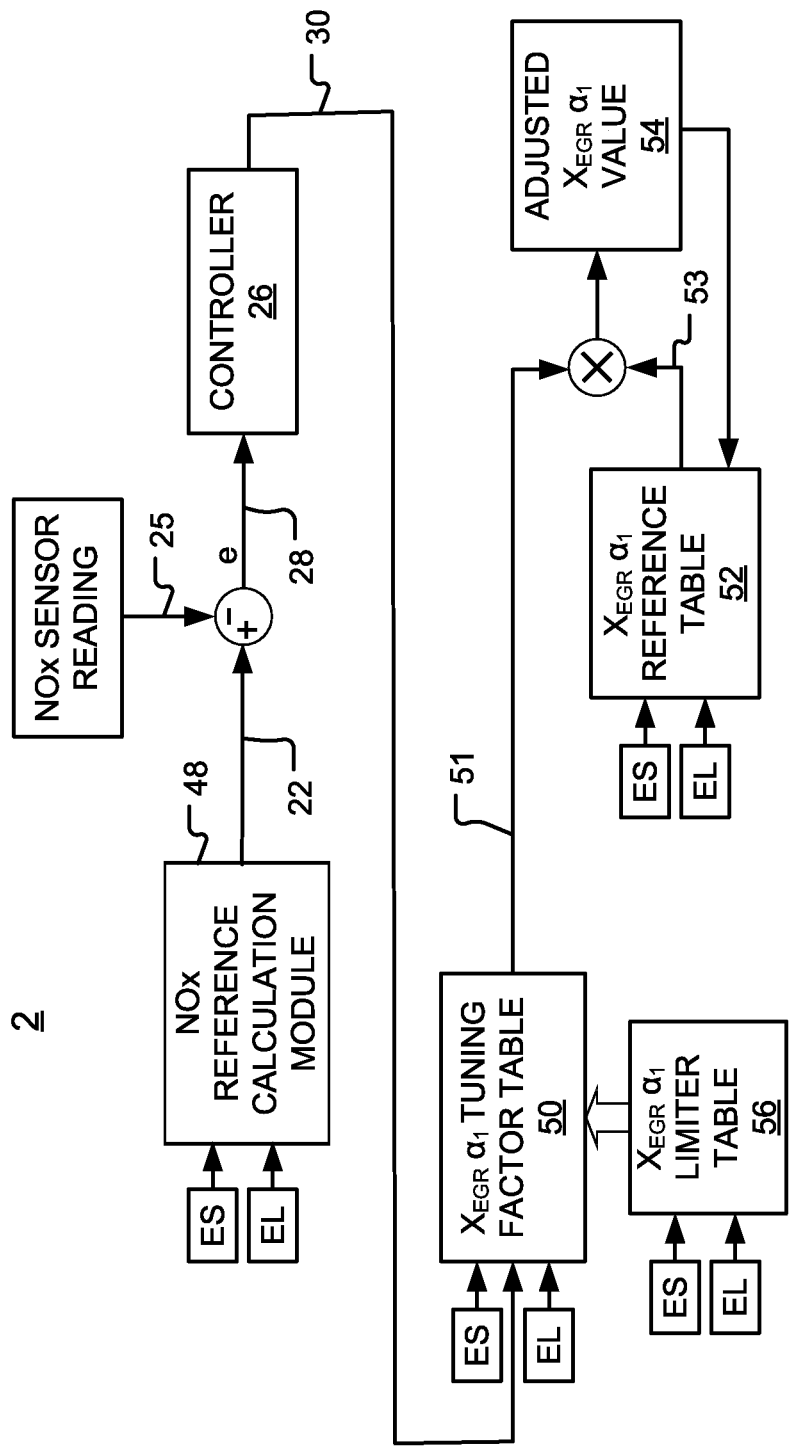
FIG. 5 is a diagram of a layout of a NOx-EGR fraction SISO control system for determining a reference $X_{EGR}$ fraction value for a steady state operating condition of an internal combustion engine according to an exemplary embodiment.

FIG. 5 shows a more specific example of a layout of an engine out NOx-EGR fraction SISO control system 2 that controls NOx via an adjustment of a reference EGR fraction value $X_{EGR}$ stored in an adjustable lookup table 32 for a current steady state operating condition. The layout of control system 2 can be part of an engine controller (e.g., the ECM/ECU logic). More specifically, for a requested engine speed (ES) value, engine load (EL) value, fueling rate input value, noisy EGR input value and/or MCF input value, an expected NOx reference value can be calculated at NOx reference calculation module 48, for example, using a pre-calibrated lookup table. In an embodiment, MCF and EGR input values can be determined using a current value of the $X_{EGRcmd}$ or $MCF_{cmd}$ in the $\alpha_1$ or $\alpha_0$ reference tables, where choice of an $\alpha_1$ or $\alpha_0$ table depends on the whether the requested operation is a steady state mode or a transient mode. An error signal "e" is provided on signal path 28 and corresponds to a difference between the calculated NOx reference on signal path 22 and a feedback signal on signal path 25 related to an engine out NOx sensor reading. The controller 26 receives the error signal and outputs a control signal value corresponding to the value of the error signal to signal path 30.

An $\alpha_1$ tuning factor table 50 can be a pre-calibrated table receives as inputs the control signal on signal path 30 and the requested ES and EL values and determines a tuning factor based on the received inputs and provides the tuning factor on signal path 51. Meanwhile, an $X_{EGR}$ $\alpha_1$ reference table 52 determines an $X_{EGR}$ fraction value for steady state operation based on the requested ES and EL and provides a signal corresponding to the determined $X_{EGR}$ fraction value on signal path 53. The initial or default values contained in the $X_{EGR}$ $\alpha_1$ reference table 51 can be pre-calibrated (nominal) values associated with a baseline engine. The signals on signal paths 51 and 53 combine using a multiplication process to provide an adjusted $X_{EGR}$ fraction $\alpha_1$ reference value 54. The adjusted $X_{EGR}$ fraction $\alpha_1$ reference value 54 can be used to build an updated $X_{EGR}$ fraction $\alpha_1$ reference table or to adjust the $X_{EGR}$ fraction value in a pre-calibrated $\alpha_1$ reference table 52 based on the tuning factor output from the $X_{EGR}$ $\alpha_1$ tuning factor table 50. Also shown in FIG. 5 is an $X_{EGR}$ $\alpha_1$ limiter table 56, which can be provided to monitor the generated tuning factor and control signal for a current operating condition and prevent generating a tuning factor greater than a practical limit for that operating condition.

While the SISO control system 2 shown in FIG. 5 is an engine out NOx controller using EGR fraction as the target lever, this is only one of plural possible SISO candidate controllers that can be utilized for a specific operating point, eight of which are shown in Table 1:

TABLE 1

| Controlled Parameter | Operating Parameter (lever) |
| --- | --- |
| 1. Engine out $O_2$ | EGR fraction |
| 2. Engine out $O_2$ | MCF |
| 3. Engine out $\lambda$ | EGR fraction |
| 4. Engine out $\lambda$ | MCF |
| 5. Engine out NO$x$ | EGR fraction |
| 6. Engine out NO$x$ | MCF |
| 7. Intake-$O_2$ | EGR fraction |
| 8. Intake-$O_2$ | MCF |

Other controllers are possible, such as those based on fueling as the operating parameter. One feature of the overall strategy is that instead of focusing on one sensor/actuator pair, different combinations can be tested considering the relationships among EGR fraction, MCF, NOx, PM, etc. For example, for different operating regions, different controllers can be used depending on the control performance. Preferably, at any particular operating mode, the lever (i.e., EGR position, MCF position etc.) that has the maximum effect on the outputs (NOx, PM, Intake O2 or exhaust O2) is determined. In other words the sensitivity of each of the inputs to each of the inputs in determined and the input-output pair with the maximum sensitivity can be chosen as the controller at that point.

The present disclosure provides a simplified SISO controller that controls one of NOx, $\lambda$, intake $O_2$ and exhaust $O_2$, for an operating condition, by adjusting only one engine operating parameter selected from $X_{EGR}$ fraction, adjust MCF, or fueling rate as opposed to a more complex system that elaborates on the controller (e.g., a multiple input multiple output (MIMO) system). In any given region on the engine map, the most impacting target reference is known, i.e., EGR fraction, MCF, or fueling, and therefore in a particular operating region one of EGR fraction, MCF, or fueling should change, or be adjusted to control NOx, $\lambda$, PM and $O_2$. As long as controlled target is converging to the nominal value, then the adjustment going the right way and will start adjusting the references for EGR, MCF or fueling in an online fashion for off-nominal engines that are not meeting the specification. Therefore, the SISO system makes efficient use of sensor reading and finds the most effective operating parameter lever (EGR fraction, MCF, or fueling) for more uniform performance among the off-nominal engines.

For a transient mode $\alpha_0$ reference, the control signal is unable to converge to an appropriate gain factor due to the transient nature of the engine operation. To solve this problem, the whole engine operating area can be divided into many cells according to x index (engine speed) and y index (total fueling/load) of the $\alpha_1$ tuning table. Since the engine will visit some cells more frequently than others, all cells can be ranked according to the density of FTP points in each cell and some cells with low visiting frequency can be overlooked. For example, the top 20 cells can constitute a specific driving cycle for generating $\alpha_1$ tuning factors first, although finer granularity of control can be gained if this tuning function is explored for the entire driving map. A calibrated fraction of the steady state $\alpha_1$ gain factors can then be used to determine the transient state $\alpha_0$ reference values of transient mode operation.

Figure 6:
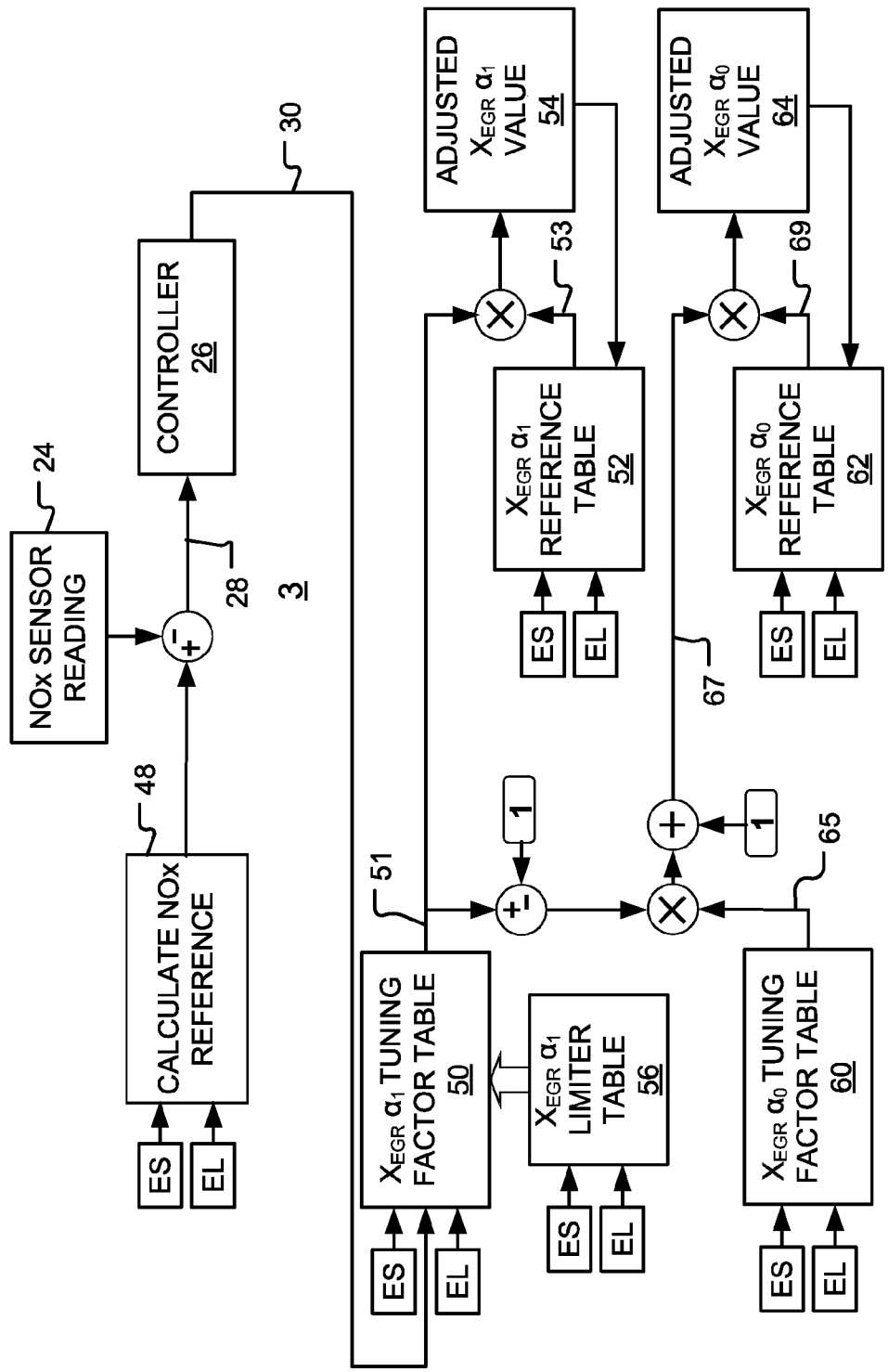
FIG. 6 is a diagram of an exemplary layout of a NOx-EGR fraction SISO control system for determining a reference $X_{EGR}$ fraction value for a transient state operation based on an adjusting factor determined for a steady state operation of an internal combustion engine according to an exemplary embodiment.

FIG. 6 is a diagram of an exemplary layout of an engine out NOx SISO control system 3 that controls NOx via an adjustment of a reference $X_{EGR}$ fraction value for steady state operations as described above, and adjusts a reference $X_{EGR}$ fraction value for transient state operations based on the adjusting factor determined for the steady state operation. Elements having the same reference numbers as those in FIGS. 1 and 5 are described above. The controller system 3 carries out another feature of the disclosure, which extends the steady state benefit to transient state. More specifically, the strategy of the SISO controller 3 includes using a tuning factor generated by the $\alpha_1$ tuning factor table in the determination of an adjusted transient state operating parameter reference value for transient state mode of operation.

With reference to FIG. 6, the tuning (adjusting) factor output on path 51 from the $\alpha_1$ tuning factor table 50 is a number greater or less than 1, but in the neighborhood of 1 (e.g., 1.01 or 0.99). The tuning factor is multiplied with the $X_{EGR}$ (i.e., the EGR fraction) value output by the $X_{EGR}$ $\alpha_1$ (steady state) reference table 52 for that operating condition (i.e., engine speed (ES) and engine load (EL)). This multiplication scales the current $X_{EGR}$ reference value up or down based on the error signal provided to the PID controller 26, which generates the new $X_{EGR}$ reference value 54 for the $X_{EGR}$ $\alpha_1$ reference table 52. To generate an adjusted $X_{EGR}$ $\alpha_0$ reference value 64 for the $X_{EGR}$ $\alpha_0$ (transient) reference table 62, the percentage change provided by the $\alpha_1$ tuning table can be calculated by subtracting "1" (e.g., for a tuning factor of 1.01, a 1% adjustment) and use the tuning factor output from $X_{EGR}$ $\alpha_0$ tuning factor table 60 to generate a fraction of the fraction, or a percent of the percent change. For example, for a 1% adjustment for $\alpha_1$, and a 30% impact represented by a value 0.3 on path 65 from the $X_{EGR}$ $\alpha_0$ tuning factor table 60, the multiplication would result in 0.003, to which "1" is added back to generate an effective 1.003 output on path 67 from the $\alpha_0$ tuning factor table 60. The effective $X_{EGR}$ $\alpha_0$ tuning factor on path 67 is multiplied with the $X_{EGR}$ $\alpha_0$ reference value on path 69 to provide the adjusted $X_{EGR}$ $\alpha_0$ reference value 64, which is used as an $X_{EGR}$ $\alpha_0$ reference value in a new $X_{EGR}$ $\alpha_0$ reference table or to replace the $X_{EGR}$ $\alpha_0$ reference value at the transient operating condition in the existing reference table. Other embodiments can use different respective schemes to determine a $X_{EGR}$ $\alpha_0$ tuning factor based on the calibration determined for the $X_{EGR}$ $\alpha_1$ tuning factor.

Figure 7:
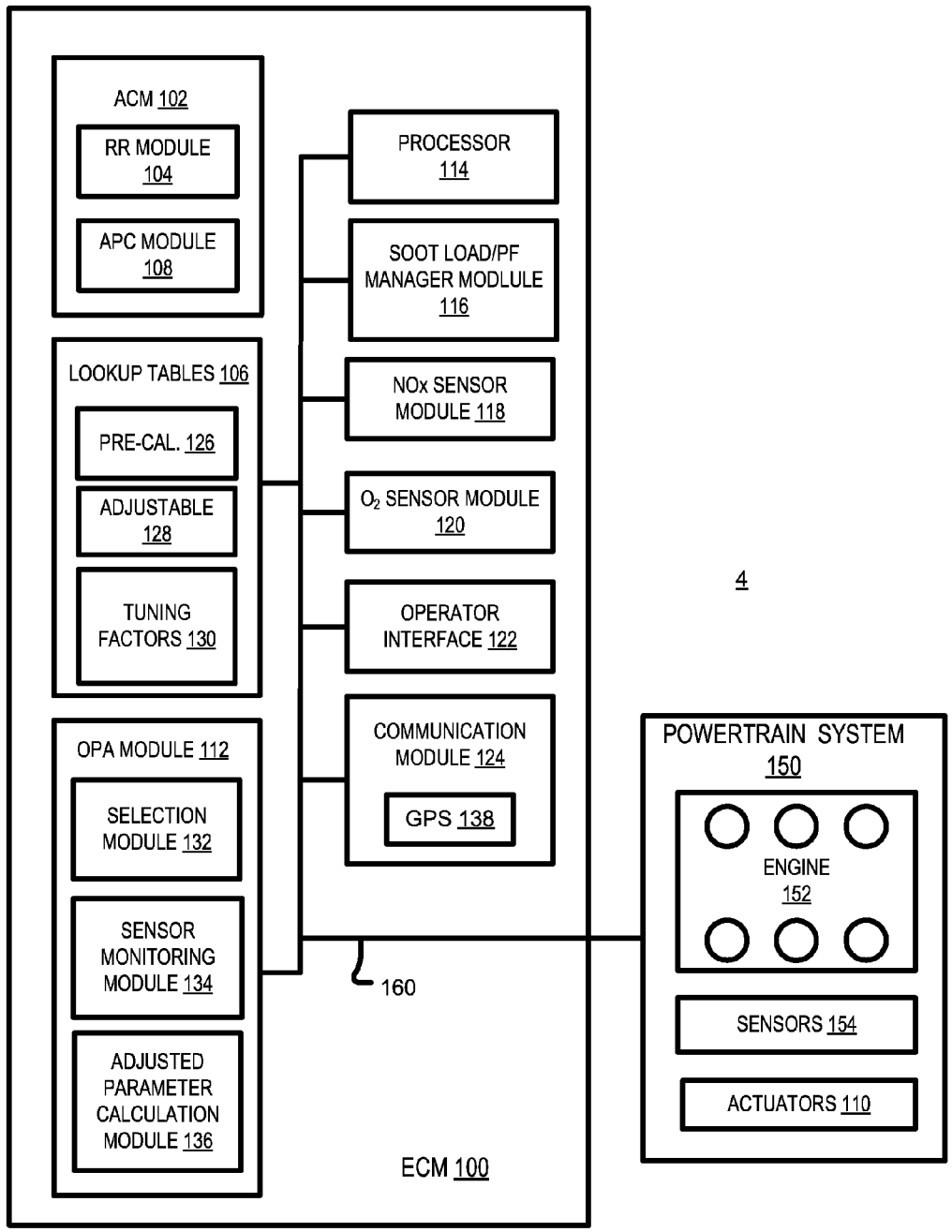
FIG. 7 is a system diagram of an internal combustion engine system including SISO control according to an exemplary embodiment.

FIG. 7 is a diagram showing an exemplary internal combustion engine system 4 that can adjust operating parameters (MCF, EGR fraction, or fueling) to compensate for variations in engine out emissions (i.e., PM and/or NOx) resulting from engine-to-engine variation. The internal combustion engine system 4 includes an ECM 100 and powertrain system 150. In an embodiment, plural modules and memory containing data structures that are configured to perform various system functions are integrated into the ECM 100, although in other embodiments, one or more of the depicted modules can be implemented in a module separate from the ECM. The ECM 100 also can include fewer or more modules in addition to those shown.

The ECM 100 includes an actuator control module (ACM) 102 that receives a requested or expected engine speed and engine load, a reference retrieval (RR) module 104 that retrieves operating parameters from lookup tables 106 based on the requested or expected engine speed and engine load, and an actuator positioning control (APC) module 108 that controls the actuators 110 of the powertrain system 150 based on the retrieved reference values. ECM 100 further includes an operation parameter adjustment (OPA) module 112, a processor (e.g., a microprocessor, CPU) 114, a soot load/particle filter (PF) manager module 116, an NOx sensor module 118, an O2 sensor module 120, an operator interface 122, and a communication module 124. The powertrain system 150 further includes an engine 152 and sensors 154. The components of internal combustion engine system 4 communicate via a network 160, which can be, for example, a controller area network (CAN). Although not shown, the engine system 4 can include a number of additional components, such as an aftertreatment system including, for example, a PF (e.g., a DPF), a diesel oxidation catalyst (DOC) and/or a selective catalytic rejection (SCR) catalyst.

As shown in FIG. 7, lookup tables 106 include pre-calibrated (PRE-CAL.) tables 126 that contain data structures including baseline or default steady state operating parameter reference values for each requested engine speed and load (torque). The reference values can include the corresponding fueling, injection timing, MCF, and EGR fraction. Lookup tables 106 also include actuator positioning information related to the reference values, for example, throttle position, VGT bypass valve position, EGR valve position, etc., which the APC module utilizes to position actuators 110 of the powertrain system 150. Pre-calibrated table 126 additionally includes reference values for engine out $O_2$, $\lambda$, and NOx, and intake $O_2$ associated with each requested pair of engine speed and power.

Lookup tables 106 include adjustable tables 128 corresponding to a least a subset of the pre-calibrated table listings. For example, adjustable tables 128 can include a complete set of operating parameter reference values and the pre-calibrated tables 126 can be stored as read-only default or reset values. The adjustable tables 128 can be initialized using the pre-calibrated operation parameter reference values, and thereafter the stored MCF and EGR fraction targets associated with a requested pair of engine speed and load periodically, intermittently, or continuously updated (tuned or adjusted) based on current MCF or EGR fraction values for the requested or expect engine speed and load, and a tuning factor stored in tuning factors table 130. A tuning factor is a number around the value of one, and can be retrieved using a signal generated by controller 26 based on the difference between one of the engine out $O_2$, $\lambda$, and NOx, and intake $O_2$ reference values stored in the pre-calibrated tables 126 and/or adjustable tables 128 and a sensed value of the engine out $O_2$, $\lambda$, and NOx, and intake $O_2$.

Adjustments to the adjustable tables are carried out by the OPA module 112. The OPA module 112 includes a controller selection module 132 that includes the controller selection logic 24 that, when executed by processor 114, selects a controller having a suitable parameter lever, MCF or EGR fraction, and an associated sensor feedback from among plural sensors 144 monitored by a sensing monitoring module 134 (see, reference 23 of FIG. 1), for a currently demanded or expected engine speed and load.

In an embodiment, the controller selection module accesses a predetermined table (not shown) having a listing of controllers (see Table 1) associated with engine speed and load operating points for where each association is based on simulated or calculated conditions at various operating modes and interpolated points therebetween. In an exemplary embodiment, choice of either EGR fraction or MCF as the lever can depend on which one contributes more to exhaust $O_2$ fraction, $\lambda$, NOx, or intake $O_2$ variation.

Figure 8:
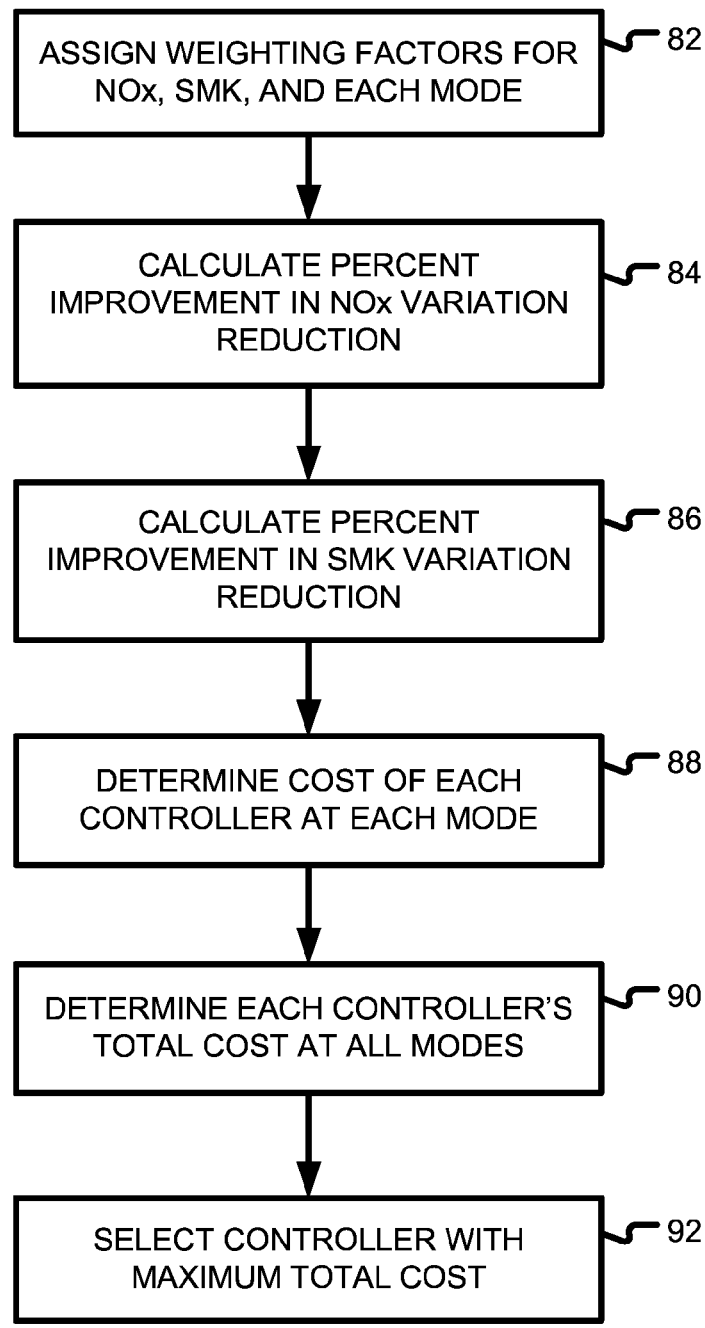
FIG. 8 is a diagram of an exemplary process for selecting a controller.

FIG. 8 shows an exemplary process flow 80 for selecting a controller from among eight available controllers, although it is to be understood that a similar method can be applied where more or less than eight controllers are available. In the exemplary process flow 80, process 82 associates weighting factors to each of NOx and smk (particulate matter or smoke) based on preference, engine operating point or other criteria. For example, for equal weight, NOx can be associated with weighting factor A=0.5, and smk can be associated with weighting factor B=0.5. Weighting factors also are associated with each operating mode. For example, each of the twelve FTP modes A25, A50, A75, A100, B25, B50, B75, B100, C25, C50, C75, C100 can be assigned a weighting factor $W_{mi}$, where i=1, 2, ... 12. Next, process 84 determines the percent improvement in NOx variation reduction as NOx_%_j,i, and process 86 determines the percent improvement in smk variation reduction as smk_%_j,i, each of which is based on a change in the standard deviation from an uncontrolled stated to a controlled state. Here, the "j,i" represents that for each one of the controllers j, where, for example, j=1, 2, ... 8, the percent improvement in NOx and smk variation reduction is determined for each mode i, where, for example, i=1, 2, ... 12. In an embodiment, this can be carried out utilizing simulations/studies to determine performance for various combinations of speed/torque and in various modes, which can be encoded into a lookup table in the controller selection logic 24. Next, process 88 determines the cost of each controller at each mode: $Con_j m_i = (A*NOx\_\%\_j,i + B*smk\_\%\_j,i)*W_{mi}$, where j=1, 2, ... 8 and i=1, 2, ... 12. Next, process 90 determines each controller's cost: $C_j$ at all modes, where j=1, 2, ... 8. For example, $C_1 = sum\{Com_1\_mi\}$, where i=1, 2, ... 12. In process 92, the controller having the maximum cost at all modes is selected as the controller: controller selection=max$\{C_1, C_2, ... C_{12}\}$.

Returning to FIG. 7, adjusted parameter calculation module 136 of OPA module 112 includes logic executed by processor 114, which tracks an error between the reference value and sensed value of exhaust $O_2$ fraction, $\lambda$, NOx, or intake $O_2$, and modifies the MCF or EGR fraction target value using a tuning factor from tuning factor table 130 based on the tracked error at an operating point and stored (e.g., updates) the target value for that operating point in the adjustable table 128. The sensed reference value can be provided by NOx sensor module 118 or $O_2$ sensor module 120, each of which can calculate the engine out NOx and $O_2$ fraction based on virtual and/or physical sensors, although and intake $O_2$ can be derived from outputs of engine out NOx and O2 sensor modules or sensed in a more direct manner. For example, an intake manifold $O_2$ sensor can be used to measure intake $O_2$, an exhaust $O_2$ sensor can be used to measure exhaust $O_2$, and an NOx sensor can be used to measure NOx. Each such sensor output is a direct measurement available in the engine. In another example, $O_2$ (intake or exhaust) can measured indirectly based on $CO_2$ measurements and fuel quantity. For each requested or expected ES and EL pair, the ECM 100 includes logic of an actuator adjustment module (not shown) that causes actuators 146 of the powertrain system 140 to move to a position to achieve current target MCF or EGR fraction parameter values stored in the adjustable lookup tables 128.

The adjusted parameter calculation module 106 can include logic that determines a transient state operating parameter reference value associated with a transient state operating mode, for example, as described above with respect to FIG. 6. For example, the pre-calibrated tables 126 and tuning factor tables 130 also can include tables related to transient state operation. For example, transient state tuning factor tables can based on a fractional amount of the steady state tuning factor generated by the controller 26 and steady state tuning factor table, and the reference operating parameter reference values for each requested transient state engine speed and load (torque) values can be adjusted based on the steady state tuning factors and transient state tuning factors stored in tuning tables 130. Similar to the steady state tables, the transient state tables can the initialized at pre-calibrated transient state reference values, and thereafter adjusted.

The soot load/PF manager module 116 includes logic for estimating soot load (i.e., PM loading) in the PF and can execute regeneration routine periodically or intermittently, based on the estimated condition, to oxidize soot in the filter. Operating an internal combustion engine system with adjusted MCF and EGR fraction targets results in less PM variation from engine-to-engine, and thus more accurate PM estimates.

The operator interface 122 of the ECM 100 receives input from the system operator, such as requests for operation at a specific engine speed (ES) and load (EL), for example, based on the position of an accelerator pedal. Operator interface 122 also can provide the operator with status of various system components and allow the operator to manipulate environmental conditions and display output. Communication module 124 (e.g., a CAN network module) can include a GPS unit 138 to receive information to determine coordinate positioning and/or supply data in advance of an operation or forthcoming positions or in real-time as the vehicle is operated and route traversed. In an embodiment, an expected ES and EL can be determined based on vehicle position and terrain information and applied automatically in a cruise control mode.

Embodiments consistent with the present disclosure can automatically adjust engine operation parameters to account for engine-to-engine variations and to optimize an amount of NOx/PM and fuel economy, while keeping emission below an acceptable level. This is made possible by way of closed-loop engine control that can minimize PM variation due to engine-to-engine variation.

Additionally, embodiments of the disclosure allow for design margins that are closer to the emissions requirement because off nominal engines can be brought to within specifications though adjustment of engine operating parameter reference value for different operating conditions.

Embodiments of the present disclosure can improve PM variation among engines and improve accuracy of soot load estimation. Since the soot load/PF manager 116 makes decisions on regeneration control tactic based on soot load estimation, embodiments applying strategies disclosed herein can avoid excessive PF regeneration and protect the aftertreatment system.

Although a limited number of exemplary embodiments is described herein, one of ordinary skill in the art will readily recognize that there could be variations to any of these embodiments and those variations would be within the scope of the disclosure.

What is claimed is:

1. A system, comprising:
a selection circuit configured to select, for an operating point of an internal combustion engine, one operating parameter lever and one emissions characteristic, said selected operating parameter lever related to one of an exhaust gas recirculation fraction or a charge air mass flow;
a reference retrieving circuit adapted to retrieve a stored pre-calibrated reference value associated with the selected emissions characteristic for the selected operating parameter lever, said pre-calibrated reference value based on predetermined reference data associated with a respective operating point of a nominal internal combustion engine;
a difference calculating circuit adapted to:
receive data corresponding to a measured value of the selected emissions characteristic, and
calculate a difference between the pre-calibrated reference value of the selected emissions characteristic for the nominal internal combustion engine and the measured value of the selected emissions characteristic for the internal combustion engine;
a controller adapted to provide a control instruction based on the calculated difference; and
an operating parameter adjustment circuit adapted to:
receive the control instruction,
determine an adjustment factor value based on the control instruction and the operating point,
retrieve a stored operating parameter reference value related to selected operating parameter lever for the respective operating point, and
store an adjusted value of the stored operating parameter reference value based on the adjustment factor value;
wherein the controller is adapted to operate the internal combustion engine based on the stored adjusted value of the stored operating parameter reference value.

2. The system of claim 1, wherein storing the adjusted value of the stored operating parameter reference value comprises storing an adjusted operating parameter reference value in a separate adjustable steady state reference table.

3. The system of claim 1, wherein the emissions characteristic reference value is one of engine out $O_2$, engine out $\lambda$, engine out $NO_x$, and intake $O_2$.

4. The system of claim 1, wherein said adjustment factor value and said stored operating parameter reference value are associated with a steady state operating mode, said adjustment factor circuit is further adapted to:
determine a transient state operating mode adjusting factor based on the operating point, retrieve a stored transient state operating parameter reference value associated with a transient state operating mode, and store an adjusted value of the stored transient state operating parameter reference value based on the transient state operating mode adjustment factor.

5. The system of claim 4, wherein storing the adjusted value of the stored transient state operating parameter reference value comprises storing an adjusted transient state operating parameter reference value in a separate adjustable transient state reference table.

6. The system of claim 1, further comprising:
a limiter circuit adapted to:
compare the determined adjustment factor value with a predetermined limiting value for the requested operating point, and
limit the determined adjustment factor value to a value not exceeding the predetermined limiting value.

7. A method, comprising:
accessing, by a controller for an engine system, one or more operating parameters for operating an internal combustion engine of the engine system at an operating point;
determining, for the operating point, by the controller, one operating parameter reference lever from the accessed one or more operating parameters and one emissions characteristic, said determined operating parameter reference lever related to one of an exhaust gas recirculation fraction or a charge air mass flow;
retrieving, by the controller, a pre-calibrated reference value for the determined emissions characteristic, the pre-calibrated reference value based on predetermined reference data of a nominal internal combustion engine at the requested operating point;
receiving, by the controller, data corresponding to a measured value of the determined emissions characteristic;
determining, by the controller, a control instruction based on the difference between the retrieved pre-calibrated reference value of the determined emissions characteristic for the nominal internal combustion engine and the measured value of the determined emissions characteristic of the internal combustion engine;
determining, by the controller, an adjustment factor value based on the control instruction and the requested operating point;
retrieving, by the controller, a stored operating parameter reference value associated with the determined operating parameter reference lever for the current requested operating point;
adjusting, by the controller, the value of the stored operating parameter reference value based on the determined adjustment factor value to generate an adjusted operating parameter reference value;
storing, by the controller, the adjusted operating parameter reference value; and
controlling, by the controller, operation of the internal combustion engine based on the stored adjusted operating parameter reference value.

8. The method of claim 7, wherein the adjusted operating parameter reference value is stored in a separate steady state reference table from the stored operating parameter reference value.

9. The method of claim 7, wherein the emissions characteristic reference value is one of engine out $O_2$, engine out $\lambda$, engine out NOx, and intake $O_2$.

10. The method of claim 7, wherein said adjustment factor value and said operating parameter reference value are associated with a steady state operating mode.

11. The method of claim 10, further comprising:
determining, by the controller, a transient state operating mode adjusting factor based on the operating point;
retrieving, by the controller, a stored transient state operating parameter reference value associated with a transient state operating mode and the determined operating parameter reference lever; and
storing, by the controller, an adjusted value of the transient state operating parameter reference value based on the transient state operating mode adjustment factor.

12. The method according to claim 11, wherein the adjusted value of the transient state operating parameter reference value in a transient state reference table.

13. A system, comprising:
an internal combustion engine; and
a controller operatively and communicably coupled to the internal combustion engine, the controller configured to:
retrieve a stored pre-calibrated reference value associated with a selected emissions characteristic for a selected operating parameter lever, said pre-calibrated reference value based on predetermined reference data associated with a respective operating point of a nominal internal combustion engine;
calculate a difference between the pre-calibrated reference value of the selected emissions characteristic for the nominal internal combustion engine and a measured value of the selected emissions characteristic for the internal combustion engine;
determine an adjustment factor value based on an operating point of the internal combustion engine;
retrieve a stored operating parameter reference value related to the selected operating parameter lever for the respective operating point;
store an adjusted value of the stored operating parameter reference value based on the adjustment factor value; and
operate the internal combustion engine based on the stored adjusted value of the stored operating parameter reference value.

14. The system of claim 13, wherein the selected operating parameter is lever related to one of an exhaust gas recirculation fraction or a charge air mass flow.

15. The system of claim 13, wherein the controller is configured to receive data corresponding to the measured value of the selected emissions characteristic.

16. The system of claim 13, wherein the selected emissions characteristic reference value is one of engine out $O_2$, engine out $\lambda$, engine out $NO_x$, and intake $O_2$.

17. The system of claim 13, wherein the controller is further configured to:
determine a transient state operating mode adjusting factor based on the operating point;
retrieve a stored transient state operating parameter reference value associated with a transient state operating mode; and
store an adjusted value of the stored transient state operating parameter reference value based on the transient state operating mode adjustment factor.

18. The system of claim 17, wherein the controller is configured to store an adjusted transient state operating parameter reference value in a separate adjustable transient state reference table.

19. The system of claim 13, wherein the controller is further configured to:
- compare the determined adjustment factor value with a predetermined limiting value for the requested operating point, and
- limit the determined adjustment factor value to a value not exceeding the predetermined limiting value.

20. The system of claim 13, wherein the controller is further configured to store an adjusted operating parameter reference value in a separate adjustable steady state reference table.

* * * * *